US008456807B2

(12) United States Patent
Tallam et al.

(10) Patent No.: US 8,456,807 B2

(45) Date of Patent: Jun. 4, 2013

(54) COMMON MODE MAGNETIC DEVICE FOR BUS STRUCTURE

(75) Inventors: Rangarajan M. Tallam, Germantown, WI (US); Jeremy J. Keegan, Kewaskum, WI (US); Patrick J. Riley, Galena, OH (US); Scott D. Day, Richfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 241 days.

(21) Appl. No.: 12/838,091

(22) Filed: Jul. 16, 2010

(65) Prior Publication Data

US 2012/0014042 A1 Jan. 19, 2012

(51) Int. Cl.
*H02B 1/20* (2006.01)

(52) U.S. Cl.
USPC ........... 361/637; 361/611; 361/624; 361/648; 174/68.2; 174/72 B; 174/99 B; 324/207.2; 439/114; 439/213

(58) Field of Classification Search
USPC ................. 361/600–601, 605, 610–611, 615, 361/622, 624, 634–641, 648–650, 675
See application file for complete search history.

(56) References Cited

U.S. PATENT DOCUMENTS

| | | | | |
|---|---|---|---|---|
| 4,803,456 | A * | 2/1989 | Benesch | 338/32 S |
| 5,093,645 | A * | 3/1992 | Dorri et al. | 335/216 |
| 5,119,059 | A * | 6/1992 | Covi et al. | 336/175 |
| 6,069,321 | A * | 5/2000 | Wagener et al. | 174/99 B |
| 6,205,017 | B1 * | 3/2001 | Wilkie et al. | 361/605 |
| 6,381,122 | B2 * | 4/2002 | Wagener | 361/611 |
| 6,870,103 | B1 * | 3/2005 | Wiant et al. | 174/68.2 |
| 7,123,123 | B2 * | 10/2006 | Isurin et al. | 336/200 |
| 7,449,635 | B2 * | 11/2008 | Wiant | 174/68.2 |
| 2008/0062620 | A1 * | 3/2008 | Parker et al. | 361/605 |
| 2009/0002110 | A1 * | 1/2009 | Ahangar et al. | 336/60 |
| 2012/0017021 | A1 * | 1/2012 | Keegan | 710/305 |

* cited by examiner

*Primary Examiner* — Courtney Smith
(74) *Attorney, Agent, or Firm* — Fletcher Yoder, P.C.; Alexander R. Kuszewski; John M. Miller

(57) ABSTRACT

A magnetic device mounting system is disclosed, such as for use in electrical cabinets for distribution of power via power bus bars. The system includes a common mode magnetic device that has an opening configured to receive extensions of a set of parallel bus bars. A non-conductive support is provided, along with a conductive extension, the non-conductive support and extension being configured to coordinate to engage the opening and to support the common mode magnetic device via attachment to the bus bar.

20 Claims, 8 Drawing Sheets

COMMON MODE MAGNETIC DEVICE FOR BUS STRUCTURE

BACKGROUND

The present invention relates generally to the field of power electronic devices such as those used in power conversion or applying power to motors and similar loads. More particularly, the invention relates to a common mode magnetic device configured to cooperate with a bus structure.

In the field of power electronic devices, a wide range of circuitry is known and currently available for transmitting, converting, producing, and applying power. Depending upon the application, such circuitry may transmit incoming power to various devices and/or convert incoming power from one form to another as needed by a load. In a typical drive system arrangement, for example, constant or varying frequency alternating current power (e.g., from a utility grid or generator) is converted to controlled frequency alternating current power that can be used to drive motors and other loads. In this type of application, the frequency of the output power can be regulated to control the speed of the motor or other device. Circuitry for providing such functionality is often packaged together. Indeed, electrical systems with packaged electrical and electronic components, such as drive cabinets and motor control centers (MCCs), are known and in use. For example, a drive cabinet may include a rectifier (converter), an inverter, transitional attachments, and so forth. Further, such electrical enclosures may include bus work that communicatively couples the components with a power source and/or other components.

Electronic components such as those discussed above are typically coupled to a power source and/or load via cabling. For example, input cabling may pass into an electrical cabinet and couple with a bus system, and output cabling from the electrical cabinet may couple with a load. This cabling is often utilized with a common mode magnetic device to improve operation of the system. For example, operation of a drive system such as that discussed above often benefits from utilization of a common mode magnetic device (e.g., a common mode core) with power input and/or output from the drive system. A common mode magnetic device may include a common mode core, which is essentially an inductor. Typically, a common mode core includes numerous loops of wire disposed about a core such that the common mode core forms a toroid. Typically, a common mode core is utilized by placing the toroid around input cables to a drive system or output cables from the drive system. When a common mode core is utilized around input cables to a drive system, it typically functions to reduce harmonics or provide a line voltage buffer. When a reactor is utilized around output cables from a drive system, it typically functions to provide a filter for reflected wave reduction.

Traditional electrical cabinets, electrical components, common mode cores, and so forth make installation and/or maintenance of common mode core features inconvenient. For example, it is often necessary to disassemble and/or rearrange certain components to place a common mode core around input or output cabling. Further, it is now recognized that it can be difficult to fish the input or output cabling through the toroidal body of a traditional common mode core. Also, positioning of a common mode core at an available location is often inconvenient. For example, due to spatial limitations, a traditional common mode core may have to be positioned in a location that exposes the common mode core to additional wear and deterioration.

Accordingly, it is now recognized that it would be desirable to develop a common mode core that can be conveniently coupled to electronic components.

BRIEF DESCRIPTION

According to one embodiment of the present invention, a magnetic device mounting system is provided. The magnetic device mounting system includes a common mode magnetic device, such as a common mode core, that is formed from magnetic tape wound about the perimeter of an obround mandrel. The mandrel and magnetic tape are essentially concentric about an opening through the mandrel. The system also includes a non-conductive support and a conductive extension. The non-conductive support and the conductive extension are configured such that they coordinate to engage the opening and support the common mode magnetic device via attachment to a bus bar.

According to one embodiment, a magnetic device mounting system is provided that includes a common mode magnetic device and a housing (e.g., an electrical enclosure or a drive component housing). In one embodiment, the common mode magnetic device includes a common mode core with an opening through the common mode core. Further, in some embodiments, the perimeter of the common mode core and the opening each have an obround shape. The housing includes a receptacle formed in the housing with a plurality of conductive features extending from a central portion of the receptacle, wherein the receptacle is configured to receive the common mode magnetic device such that the plurality of conductive features pass through the opening. In some embodiments, the receptacle also includes a raised portion, such as a lip, that is shaped to correspond with the opening in the common mode magnetic device such that the raised portion engages the edges of the opening to hold it in place and prevent it from contacting the plurality of conductive features.

According to one embodiment, a common mode core is provided that includes dimensions that facilitate interaction with a bus bar system. In one embodiment, the common mode core includes a mandrel having an obround perimeter. An opening is formed through the mandrel and magnetic tape is wound around the perimeter of the mandrel. The opening is sized to facilitate cooperation with the spacing of bus bars such that power from the bus bars can readily be diverted via bus bar extensions through the opening in the common mode core without requiring that cabling be drawn together and with limited adjustments.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a common mode magnetic device (e.g., a common mode core) configured to conveniently function with a bus structure of a drive system or the like. In particular, the present technique relates to providing a common mode magnetic device that is configured to cooperate with bus bars or related extensions within the enclosure. For example, one embodiment includes a common mode core that is configured to surround conductive extensions from a receptacle formed in an outer wall of an electrical enclosure. The common mode magnetic device is generally obround and configured to be positioned about a plurality of conductive extensions and non-conductive supports that are coupled to respective bus bars. The conductive extensions may include elongate via blocks and/or bus extensions that each couple to the face of a bus bar such that current from the bus bar can be conducted in a direction traverse to the length of the bus bar and through an opening in the common mode magnetic device. The non-conductive supports may include plastic sleeves that surround side portions of the conductive extensions to prevent contact between the conductive extensions and the common mode magnetic device. The non-conductive supports may couple about the conductive extensions such that end portions of the conductive extensions remain exposed for coupling to the bus bars and other features (e.g., a bus bar extension or an electronic component). The non-conductive supports also include projections that engage either side of the common mode magnetic device when assembled such that the common mode magnetic device is insulated between the non-conductive supports and held in place relative to the bus bars.

References in the specification to "one embodiment," "an embodiment," or "an exemplary embodiment," indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, geometric references are not intended to be strictly limiting. For example, use of the term "perpendicular" doe not require an exact right angle, but defines a relationship that is substantially perpendicular, as would be understood by one of ordinary skill in the art.

Figure 1:
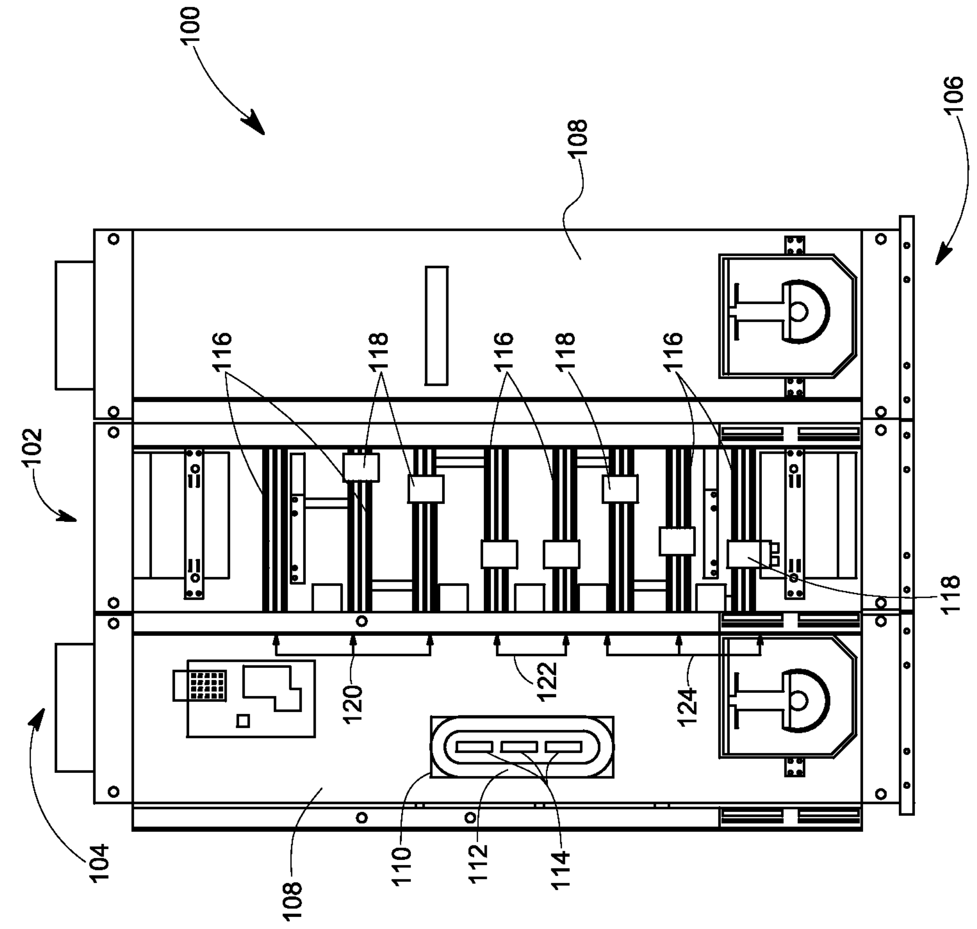
FIG. 1 is a front view of an electrical enclosure including a bus system and a common mode magnetic device in accordance with present embodiments.

Turning now to the drawings and referring to FIG. 1, an electrical enclosure 100 in accordance with present embodiments is illustrated in which electrical components of various types may be housed and connected. The enclosure 100 may be representative of a motor control center or other industrial, commercial, or marine electrical system. Specifically, in the illustrated embodiment, the enclosure 100 includes a wiring bay section 102 positioned between a pair of power drive sections 104, 106. In general, the enclosure 100 provides a protective shell around various electrical components and a bus system. For example, the enclosure 100 may include a shell 108 made of any suitable material, such as heavy gauge sheet metal, reinforced plastic, and so forth. The shell 108 also includes a recessed portion or receptacle 110 configured to receive a common mode magnetic device 112 in accordance with present embodiments. Indeed, the outer edges of the receptacle 110 may be sized to engage the outer edges of the magnetic device 112 to hold it in place. The magnetic device 112 has an obround shape with an opening through the device 112 that surrounds a plurality of electrically conductive extensions or projections 114. These projections 114 may represent an access point to provide power to or receive power from a bus system and components of the enclosure 100. Indeed, the enclosure 100 may include various devices such as programmable logic controllers, switches, motor controls, inverters, rectifiers, and so forth disposed along and/or coupled with a bus system. Further, these components and/or the power provided by such components may benefit from utilization with the magnetic device 112, as will be discussed in further detail below.

A set of bus bars 116 passes along a panel of the enclosure 100 and through each of the enclosure sections (i.e., the wiring bay section 102 and each of the drive sections 104, 106). The bus bars 116 are made of conductive material (e.g., copper or aluminum) that has been extruded to a desired length for use with the enclosure 100. Additionally, as will be discussed below, the bus bars 116 are extruded with certain cross-sectional features that facilitate communicatively coupling the bus bars 116 with expansion or attachments features 118 and devices, such as the projections 114 and/or a common mode magnetic device kit in accordance with present embodiments. These cross-sectional features also facilitate cooperation with a support system that couples the bus bars 116 to the enclosure 100 and provides flexibility in configuration of the bus system (e.g., expansion of bus bar capacity) without requiring substantial changes in the bus system. Indeed, each of the bus bars 116 is held in place within the enclosure 100 with a support system that includes bus support brackets that are formed or molded from a thermalset glass reinforced material or a non-conductive material to coordinate with aspects of the cross-sectional features. Specifically, as will be discussed in further detail below, the support brackets each include openings into which one of the bus bars 116 can slide. Each support bracket includes a main opening with slots that correspond to cross-sectional features of the bus bars 116 such that the bus bars 116 can be retained without being fastened to the brackets. In some embodiments, end caps or the like may be positioned near or around the ends of the bus bars 116 such that the bus bars 116 can essentially float within the brackets without substantial lateral sliding. This flexibility facilitates attachment to features, such as the projections 114 and/or a common mode magnetic device kit in accordance with present embodiments, by allowing slight movement of the bus bars 116 within the enclosure 100.

During operation of the illustrated embodiment, the enclosure 100 receives power (e.g., three-phase AC power) from a source (e.g., an electrical grid) and distributes the power to various devices, including the drive systems 104, 106. Further, the various components of the drive systems 104, 106 cooperate to provide power at a desired level to a load (e.g., a motor or pump) external to the enclosure 100. As a group, the set of bus bars 116 receive and transmit the power to various components within the enclosure 100. Different groupings of the bus bars 116 are coupled to different features within the enclosure, and, thus, perform different tasks. Indeed, the upper three bus bars 120, middle two bus bars 122, and lower three bus bars 124 of the set of bus bars 116 may each perform a different function. For example, the upper three bus bars 120 may receive input power, the middle two bus bars 122 may transmit power between drive system components, and the lower three bus bars 124 may provide output power. As indicated above, the projections 114 may serve as an input to the enclosure 100 or an output from the enclosure 100. For example, the projections 114 may couple with a power source such that input power (e.g., three-phase AC power) passes through the common mode magnetic device 112 upon entry into the enclosure 100 and is then transmitted to enclosure components (e.g., a rectifier) through the upper three bus bars 120. By passing the input power through the device 112 various benefits may be achieved, such as reducing harmonics. As another example, the projections 114 may couple with the lower three bus bars 124 that are providing output from converters of one or both of the drive systems 104, 106 within the enclosure 100. By passing the output power through the device 112 various benefits may be achieved, such as reducing the effects of reflected waves.

Figure 2:
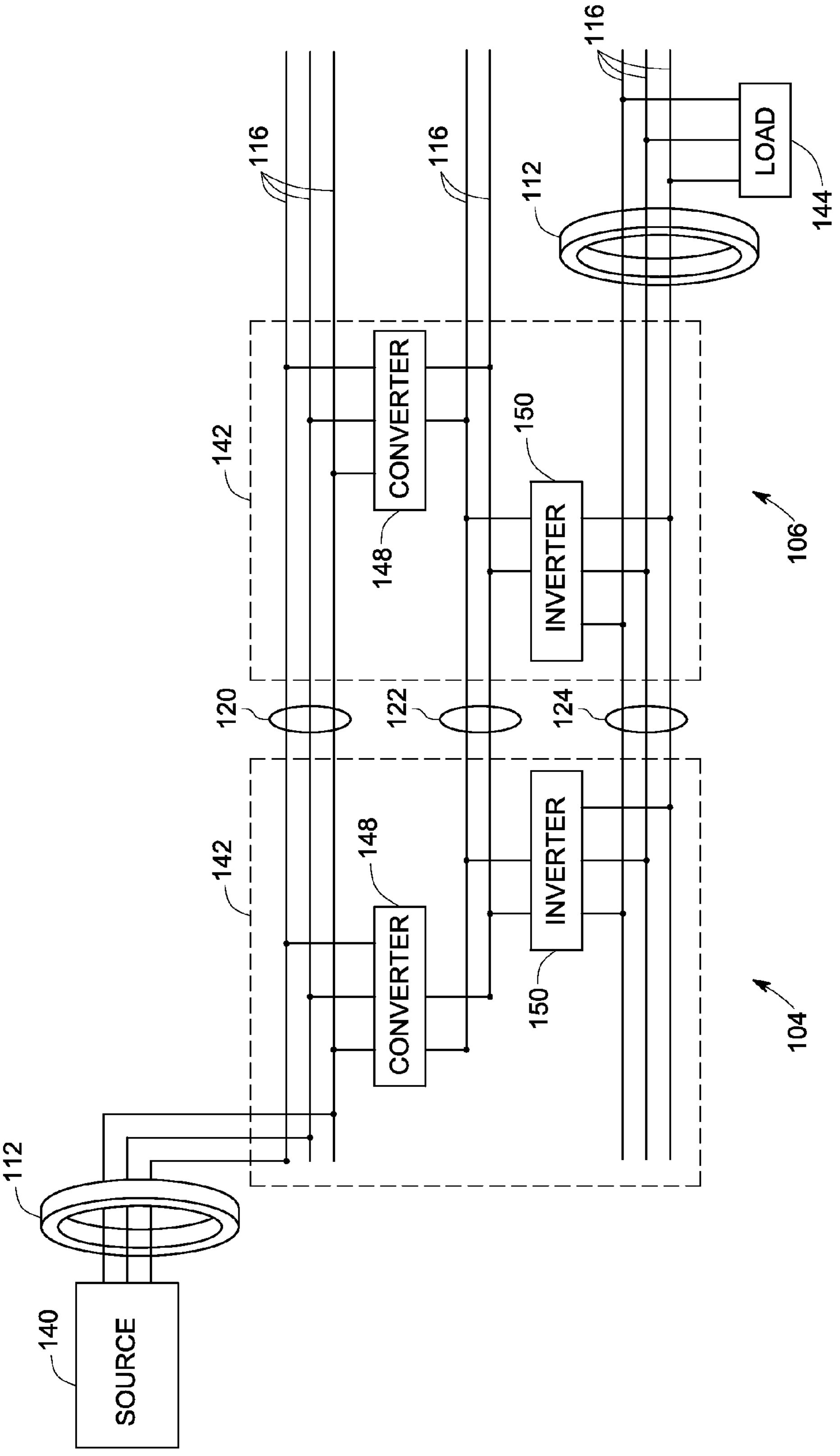
FIG. 2 is a block diagram of a pair of drive systems utilizing a bus system and a common mode magnetic device in accordance with present embodiments.

As illustrated in FIG. 2, the bus bars 116 function together to provide three-phase AC power from an electrical grid 140 to drive systems 142 of the drive sections 104, 106. The drive systems 142, in turn, provide three-phase power at a desired level for a particular load 144, such as a motor. That is, the bus bars 116 function to transmit power to the drive systems 142 at a voltage and frequency of the grid 140, transmit power within the drive systems 142 as direct current, and transmit power out of the drive systems 142 to the load 144 at a desired voltage and frequency for the load 144. Specifically, as illustrated by the block diagram in FIG. 2, three-phase AC power is received from the electrical grid 140 and transmitted via the upper three bus bars 120. The upper three bus bars 120 may receive power from the grid 140 directly or indirectly through another transmission line (e.g., via an MCC bus). The upper three bus bars 120, which may be referred to as drive input bus bars 120, are coupled to a rectifier or converter 148 of each drive system 142 so that three-phase AC power from the grid 140 is provided to the drive systems 142. In some embodiments, the three-phase AC power from the grid 140 may also be provided to other components within or related to the enclosure 100. Once the three-phase AC power is provided to the rectifier or converter 148 within each of the power drive sections 104, 106, the rectifiers 148 convert the three-phase AC power to DC power, which is then transmitted to an inverter 150 in each of the power drive sections 104, 106 via the middle two bus bars 122. Accordingly, the middle two bus bars 122 may be referred to as DC bus bars 122. The inverters 150 receive the DC power from the DC bus bars 122 and convert it to three-phase AC power that is appropriate for the load 144 via inverter circuitry, which typically includes several high power switches, such as a drive circuit and insulated-gate bipolar transistors (IGBTs). This output power is then provided to the load via the lower three bus bars 124, which may be referred to as load bus bars 124.

Input and/or output power may be filtered using one or more of the common mode magnetic devices 112. In the illustrated embodiment, two magnetic devices 112 are shown to demonstrate that the devices 112 may be positioned about power transmission lines at different points in the process. While two magnetic devices 112 are illustrated in FIG. 2, present embodiments may utilize a single magnetic device 112 or multiple magnetic devices 112. Further, the magnetic devices 112 may be utilized essentially anywhere along the bus system at a transition point from the bus system to a component in accordance with present embodiments. For example, as will be discussed further below, the magnetic device 112 may be coupled between a converter and the bus system by attaching a common mode magnetic device kit to a face of the bus bars 116. Indeed, present embodiments facilitate filtering power to a single component or section of a system by attaching bus extensions to the faces of the bus bars 116 such that power is directed traverse to the length of the bus bars 116 and positioning the magnetic device 112 such that the bus extensions and the power pass through the magnetic device 112 and into a particular electrical component (e.g., a converter). Thus, present embodiments can utilize a common mode core attached to bus works to filter power to a particular component or section of a system without filtering all of the power passing through the bus works.

As set forth above, the bus bars 116 provide power to various different components of the drive systems 142 and other features. This is achieved, in accordance with present embodiments, by communicatively coupling the various devices to the bus bars 116 via attachment or connection features 118. One type of connection feature, as will be discussed below, facilitates attachment of the magnetic device 112 to the bus bars 116 such that power can be transmitted through the opening in the magnetic device 112 without the magnetic device 112 conductively touching the bus bars 116. Such connection features 118 interlock with grooves in the bus bars 116 via bus clamps or the like. Due to the nature of the grooves in the bus bars 116, the connection features 118 can generally slide along the bus bars 116 and secure to any location along the bus bars 116 such that the connection features 118 can easily be positioned for connection with a device, power source, or the like. For example, using the bus bars and connection features 118, the magnetic device 112 can essentially be positioned anywhere along the face of the bus bars 116 to facilitate filtering the power transmitted through the magnetic device 112 before entering a particular component or being supplied to the load 114. By enabling attachment of the magnetic device 112 in this manner, one can readily install the magnetic device 112 from a front entry into the enclosure 100, and, thus, avoid complex rearrangement of components, disassembly of input and/or output cabling, and so forth associated with traditional systems.

Figure 3:
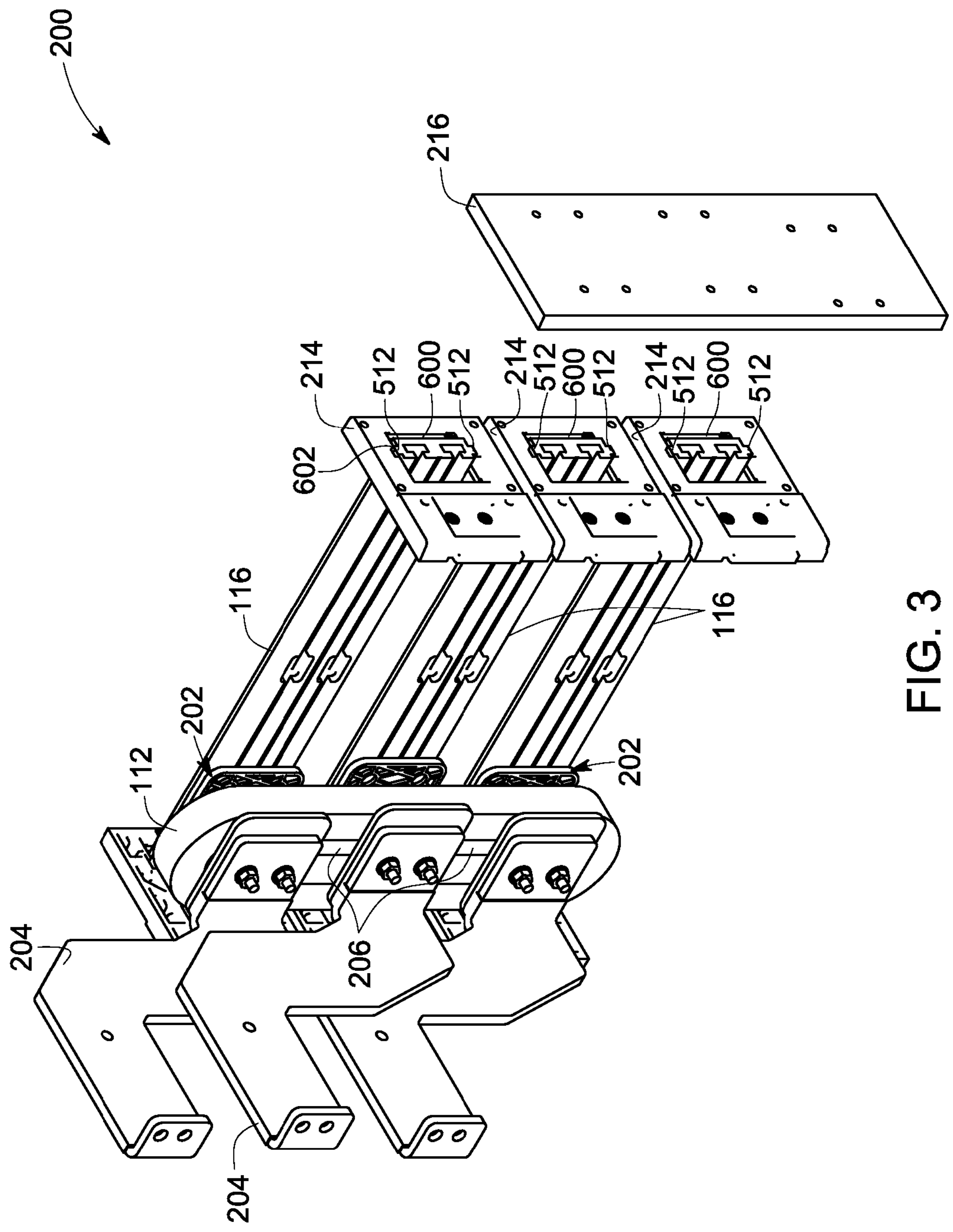
FIG. 3 is a perspective view of a bus system coupled with a magnetic device kit in accordance with present embodiments.
Figure 4:
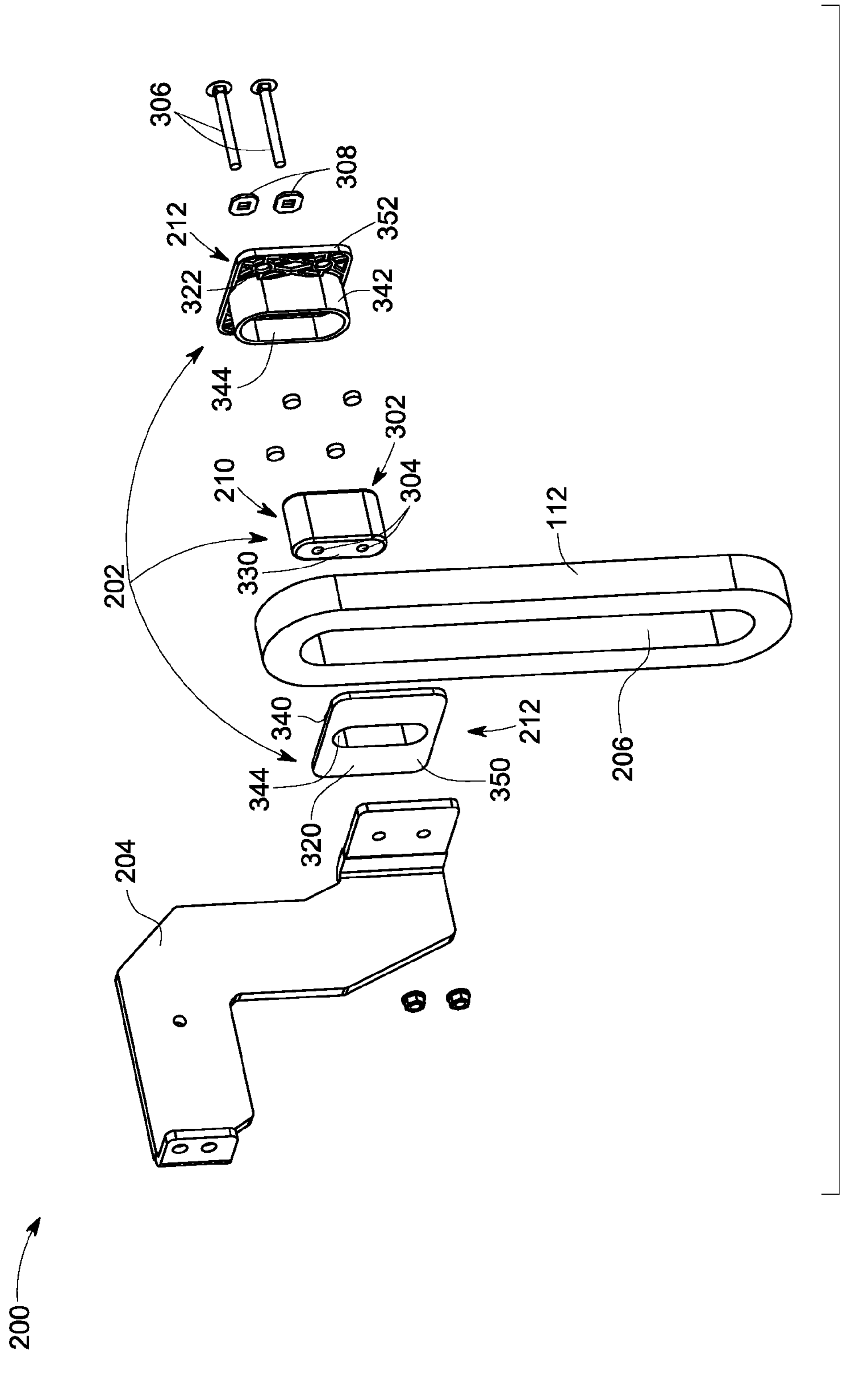
FIG. 4 is an exploded perspective view of a magnetic device kit in accordance with present embodiments.

FIG. 3 is a perspective view of a common mode magnetic device kit 200 coupled to bus bars 116 in accordance with present embodiments. The magnetic device kit 200 includes the common mode magnetic device 112, connection features 202, and bus extensions or side buses 204. The connection features 202 each pass through an opening 206 in the magnetic device 112 and are each respectively coupled with one of the bus bars 116 and one of the side buses 204. The connection features 202 each include a conductive extension 210 and a non-conductive support 212, as shown in FIG. 4, wherein each conductive extension 210 is positioned within a corresponding non-conductive support 212. This arrangement enables the connection features 202 to engage the magnetic device 112 while insulating the magnetic device 112 from the bus bars 116 and from the conductive extension component of each connection feature 202. The conductive extensions 210 and the non-conductive supports 212 of the connection features 202 cooperate with the side buses 204 and related fasteners to couple the magnetic device 112 to the bus bars 116 and to route power from the bus bars 116 through the opening 206 in the magnetic device 112. Thus, power can be taken off of the bus bars 116 at essentially any point along the bus system, which facilitates configuration of system components. For example, in a drive system, the magnetic device kit 200 may be positioned along the bus bars 116 to facilitate transmission of power from the bus bars 116 to a converter or from an inverter to the bus bars 116 for transmission to a load.

It should be noted that the geometric features in the face of the bus bars 116 facilitate coupling with the magnetic device kit 200. In the illustrated embodiment, the bus bars 116 are extruded metal and can be extruded to a desired length for an application. Further, the illustrated bus bars 116 have been extruded such that particular cross-sectional characteristics are included in a face of the bus bars 116 and along the sides of the bus bars 116. These cross-sectional characteristics, as will be discussed below, facilitate installation of the bus bars 116 and attachment of fasteners extending from the connection features 202 with the bus bars 116 in accordance with present embodiments. Further, with regard to the material utilized for the bus bars 116, different metals may be used for the extrusion to provide different functionality. For example, depending on the level of power being transmitted, the bus bars 116 may be extruded from aluminum or copper. It should also be noted that FIG. 3 illustrates the bus bars 116 being retained by support brackets 214 in accordance with present embodiments. The brackets 214 cooperate with an end cap 216 and other support features to stabilize the bus bars 116 while allowing them to essentially float within the brackets 214, which provides some level of flexibility and may facilitate configuration and coupling of components (e.g., the magnetic device kit 200) with the bus bars 116.

The features of the magnetic device kit 200 are more clearly illustrated in FIG. 4, which is an exploded view of certain features of FIG. 3. As can be seen in FIG. 4, the connection feature 202 includes various different components that are configured to assemble around and through the magnetic device 112. For example, in the illustrated embodiment, the connection feature 202 includes the non-conductive support 212 and the conductive extension 210. The conductive extension 210 includes a via block 302 made of a conductive material (e.g., aluminum). Further, the via block 302 includes coupling features 304 (e.g., bolt holes) configured to facilitate communicatively coupling the via block 302 to other components (e.g., the bus bar 116). In the illustrated embodiment, the coupling features 304 are designed to cooperate with bolts 306 and related connection features 308 to facilitate coupling with the side bus 204 and the bus bar 116. In other embodiments, the coupling features 304 may include bolt-like extensions or other fastening mechanisms. The via block 302 communicatively couples with the bus bar 116 and other components, such as the side bus 204, to facilitate transmission of power through the via block 302 in a direction traverse to the bus bar 116. This facilitates arrangement of system components and installation of the magnetic device kit 200 with the bus bar 116. The non-conductive support 212 includes a first bracket 320 and a second bracket 322 that are designed to couple together through the opening 206, on either side of the magnetic device 112, and about the via block 302. Features of the non-conductive support 212 insulate the magnetic device 112 from communicative contact with the bus bar 116 and from communicative contact with the via block 302. In other embodiments, the non-conductive support 212 may include a single bracket that wraps around the magnetic device 112 and provides similar functionality.

Specifically, in the illustrated embodiment, the conductive extension 202 includes the via block 302, which is extruded, molded, or otherwise formed from conductive material. The via block has an elongate body with an obround cross-section along its length and coupling regions or interfaces 330 on either end. The interfaces 330 of the via block 302 are substantially planar faces with the integral attachment features 304 (e.g., integral bolts and/or bolt holes). As indicated above, each of the interfaces 330 is configured to communicatively couple with electrical features to facilitate transmission of power through the magnetic device 112. For example, in the illustrated embodiment, a body of the via block 302 is configured to pass through the opening 206 in the magnetic device 112, one of the interfaces 330 is configured to communicatively couple with the bus bar 116, and the other interface 330 is configured to couple with the side bus 204. Thus, the via block 302 serves as a power conduit between the side bus 204 and the bus bar 116. The interfaces 330 may include one or more different types of coupling features. For example, in the illustrated embodiment, the interfaces 330 include bolt holes 304 that extend through the body of the via block 302 and cooperate with the bolts 306 to couple with the bus bar 116 and the side bus 204. In other embodiments, the via block 302 may include integral bolts that extend away from the via block 302 as part of the interfaces 330. Further, in some embodiments, the conductive extension 210 may include different characteristics. For example, the conductive extension 210 may include the side bus 204 and the via block 302 integrated together. Such a conductive extension 210 may pass through a single support bracket that functions as the conductive support 212, through the opening 206, and couple with the bus bar 116. In such an embodiment, the conductive support 212 may be integral with the magnetic device 112 or include features that extend around the outer sides of the magnetic device 112 and along the back sides to insulate the magnetic device 112 from the bus bar 116.

As indicated above, the connection feature 202 also includes the non-conductive support 212. The non-conductive support may be formed from compression molded plastic or other non-conductive material. While in some embodiments the non-conductive support 212 may include a single piece that wraps around the magnetic device 112, in the illustrated embodiment, the non-conductive support 212 includes the first bracket 320 and the second bracket 322 that each couple together about the via block 302 and abut opposite sides of the magnetic device 112. Specifically, a first sleeve 340 of the first bracket 320 is designed to slide into a second sleeve 342 of the second bracket 322 such that the first and second brackets 320, 322 are coupled together in a friction fit or the like. These sleeves 340, 342 are sized to couple about the via block 302 and to cover the sides of the via block 302 such that it does not directly touch the magnetic device 112 during operation. As can be appreciated, different embodiments may utilize different coupling features that function like the sleeves 340, 342. Further, the sleeves 340, 342 may each include different coupling features that facilitate secured engagement with one another (e.g., flexible tabs and grooves).

As noted above, while other embodiments may include different characteristics, the illustrated via block 302 is molded, extruded, or otherwise formed such that it has an obround cross-section. That is, the perimeters of the interfaces 330 and the body of the via block 302 are obround. Accordingly, the opening 344 formed by the sleeves 340, 342 in the illustrated embodiment is obround as well. This shape eliminates sharp corners that can cause damage. Further, the rounded edges facilitate insertion of the via block 302 into the opening 344 formed by the sleeves 340, 342 without snagging corners on the edges of the opening 344 and so forth. Likewise, the opening 206 in the magnetic device 112 is correspondingly obround such that insertion of the sleeves 340, 342 and engagement with the connection feature 302 is facilitated. Further, the length of the obround shape facilitates increased power transmission capacity of the via block 302 and a structural strength of the via block 302 for supporting the kit 200.

Also, the brackets 320, 322 include features that insulate the magnetic device 112 from surrounding components. For example, the first bracket 320 includes a first projection 350 and the second bracket includes a second projection 352 that cooperate to prevent the magnetic device 112 from touching the bus bar 116, the side bus 204, or the like when assembled. In the illustrated embodiment, these projections 350, 352 are essentially planar tabs that extend perpendicularly from the sleeves 320, 322, respectively. However, in other embodiments, different types of projections 350, 352 may be used. Each of the projections 350, 352 abuts an opposite side of the magnetic device 112 when assembled about the device 112 such that the device 112 is held in place and insulated from adjacent electrical components. In the illustrated embodiment, retention of the magnetic device 112 relative to the bus bars 116 is achieved by essentially wedging the magnetic device 112 between the projections 350, 352, which are held together by the fasteners 306, which pass through the side bus 204, the connection feature 202, and engage with grooves in the bus bar 116.

Figure 5:
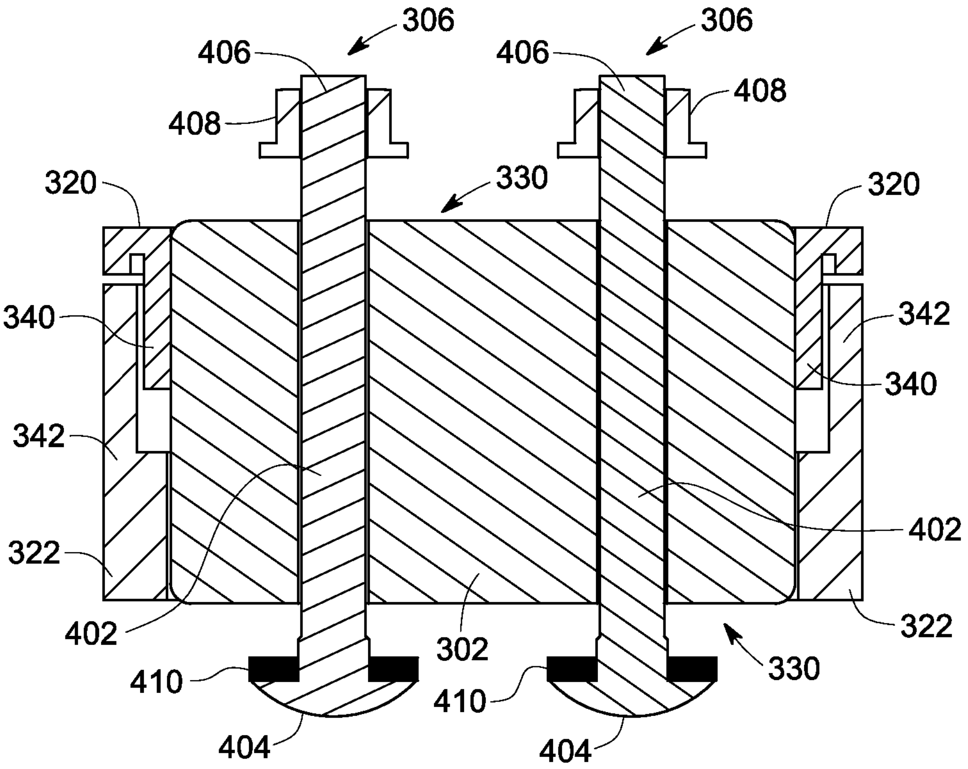
FIG. 5 is a cross-sectional view of a connection feature including a via block, a pair of non-conductive brackets including engaged sleeves, and fasteners in accordance with present embodiments.

FIG. 5 is a cross-sectional view of the assembled connection feature 202 in accordance with present embodiments. This cross-sectional view clearly illustrates the arrangement of the via block 302 within the brackets 320, 322, the engagement between the sleeves 340, 342, and the coupling provided by the fasteners 306. Specifically, FIG. 5 illustrates that the sleeve 340 passes into the sleeve 342 and establishes a friction fit. However, in other embodiments, different or additional coupling features may be employed to secure the components of the non-conductive support 212 together. Further, FIG. 5 illustrates that the via block 302 is sized to slide into the opening formed by the brackets 320, 322 such that the brackets 320, 322 cover the sides of the via block 302 and leave the interfaces 330 exposed. In some embodiments, the brackets 320, 322 may include lips around the outer edges, and the interfaces 330 of the via block 320 may include a slightly raised central portion such that the via block 302 is retained within the brackets 320, 322 yet the raised central portion can still fully abut other features (e.g., the bus bar 116) to enable communicative contact.

FIG. 5 also clearly illustrates that the fasteners 306 each include an elongate portion 402 that is integral with an expanded distal end 404 and a coupling end 406 that is engaged with a nut 408. The expanded distal end 404 may coordinate with a washer 410 to facilitate engagement with grooves in the bus bar 116, and the nut 408 may facilitate tightening of that engagement and engagement with other components (e.g., the side bus 204). It should be noted that the fasteners 306 extend through the via block 302 and beyond the ends of the brackets 320, 322. As better illustrated in FIG. 3, this additional length enables coupling of the fasteners 306 to components, such as the side bus 204 and the bus bar 116.

Figure 6:
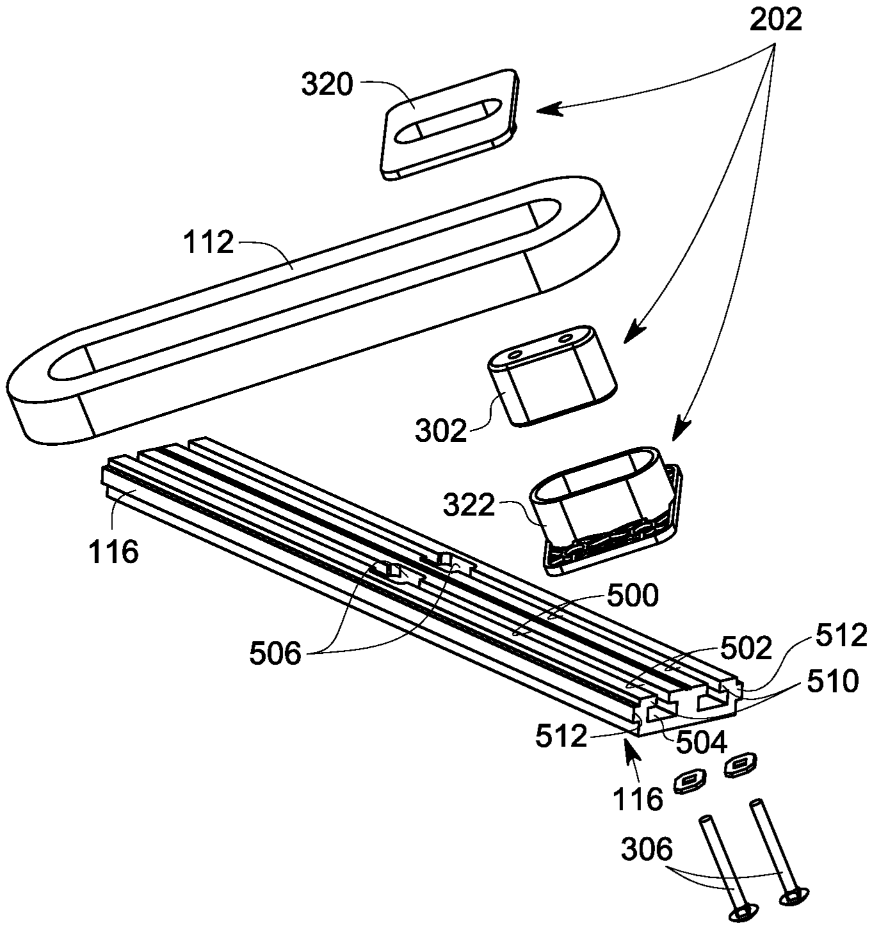
FIG. 6 is a perspective view of a bus bar, a common mode magnetic device, and components of a connection feature in accordance with present embodiments.

FIG. 6 is an exploded perspective view of the magnetic device 112, components of the connection feature 202, and the bus bar 116 in accordance with present embodiments. In the illustrated embodiment, the connection feature 202 is configured to couple with grooves 500 in the bus bar 116. The grooves 500 have a cross-section that includes a narrow channel 502 with an expanded cavity 504. Thus, the grooves 500 can slideably receive a component of the connection feature 202 or a fastner with a narrow neck and an expanded distal end. In other words, a fastener or component of the connection feature 202 including a narrow neck and an expanded distal end can slide along one of the grooves 500 when the narrow neck is positioned within the narrow channel 502 and the expanded distal end is positioned within the expanded cavity 504. For example, in the illustrated embodiment, the elongate portions 402 of the fasteners 306 are configured to extend through the via block 302 and into the grooves 500. The elongate portions 402 are each integral with the expanded distal ends 404 that are capable of being slideably positioned within the expanded cavity 504 of the corresponding grooves 500. In other embodiments, the connection feature 202 may include or coordinate with different types of fasteners, such as a bus clamp including a bolt with a separate plate feature that couples with the bolt to function as the expanded distal end. The sliding engagement between the fasteners 306 and the grooves 500 facilitates connection at any location without added hardware or support. The distal ends 404 may be inserted into the corresponding grooves 500 at an end of the bus bar 116 or via openings 506 that are machined into each of the grooves 500. By positioning the fasteners 306 within the grooves 500 in this manner, the nuts 408 can be tightened such that the distal ends 404 are pulled against lips 510 of each groove 500 that extend toward the narrow channel 502 and over the expanded cavity 504. Thus, the connection feature 202 (and the magnetic device 112) can be securely fastened to the bus bar 116 at various locations along the bus bar 116.

With regard to the geometry groove features and so forth of the bus bar 116, it should be noted that multiple grooves 500 are employed to reduce moment of the connection feature 202 about the bus bar 116 and to facilitate uniform contact between the bus bar 116 and the via block 302. Indeed, in accordance with present embodiments, the torque present when the bus bar 116 is coupled with the connection feature 202 facilitates the provision of communicative contact between the bus bar 116 and the via block 302. It should be noted that while two grooves 500 are provided in the embodiment illustrated by FIG. 6, in other embodiments, additional grooves may be included. For example, the bus bar 116 may be extruded with three or more grooves 500 such that the bus bar 116 is capable of making multiple connections to attachment features at essentially any location along the bus bar 116.

The bus bar 116 may also be extruded with ridges 512 that extend along the edges of the bus bar 116. The ridges 512 may coordinate with support features to maintain stability of the bus bar 116 within an enclosure. For example, turning back to FIG. 3, the bus bars 116 are shown disposed within the molded brackets 214, which are formed (e.g., molded) from non-conductive material. The brackets 214 are configured to slidably receive the bus bars 116 into a receptacle disposed within each of the brackets 214 and to attach with an enclosure (e.g., the enclosure 100) or other support features. As can be seen in FIG. 3, the support brackets 214 do not necessarily couple directly to the bus bars 116 but engage with cross-sectional features of the bus bars 116 to prevent rotation or movement in certain directions, while allowing the bus bars 116 to float laterally. Specifically, the brackets 214 include a main opening 600 with gaps 602 on either side that engage with the ridges 512 disposed along the sides of the bus bars 116. These ridges 512 and gaps 602 prevent rotation of the bus bar 116 about a lengthwise axis of the bus bar 116 while allowing it to essentially float laterally within the brackets 214. The brackets 214 also include expanded capacity space on either side of the main opening 600 to accommodate a splice or an expanded bus bar, which facilitates an increase in capacity of the bus bar without changing the geometry of the grooves 500 and so forth. This type of flexibility facilitates installation of the magnetic device 112 by reducing the need to rearrange components and so forth.

Figure 7:
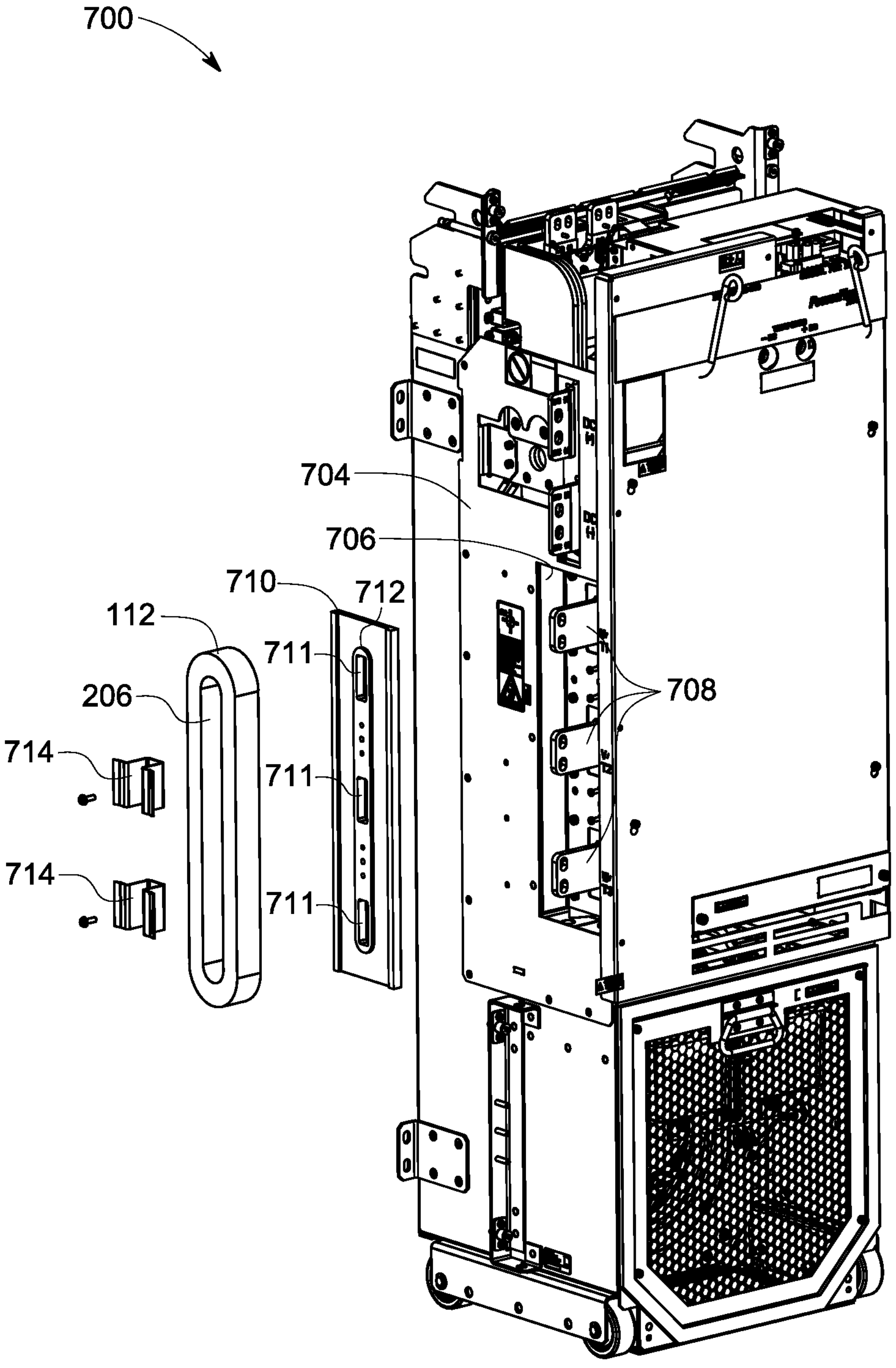
FIG. 7 is a perspective view of an inverter with an opening in a housing that facilitates coupling with a common mode core in accordance with present embodiments.

As indicated above in the discussion of FIG. 1, in some embodiments, the magnetic device 112 may essentially couple with a recess within an enclosure such that the magnetic device 112 is positioned around one or more conductive features. For example, FIG. 1 illustrates the magnetic device 112 positioned within the receptacle 110 and around the projections 114. In other embodiments, different component enclosures or features may include such a receptacle. For example, FIG. 7 illustrates an inverter section 700 of a drive system. A wall 704 of the inverter section 700 includes a receptacle 706 that is configured to receive the magnetic device 112 about a set of conductive tabs 708. The conductive tabs 708 are configure to couple with a bus system within an enclosure in accordance with present embodiments. For example, in some embodiments, the conductive tabs 708 may couple with or include coupling features that attach with the grooves 500 of the bus bar 116, as discussed above.

It should be noted that the receptacle 706 engages with a panel 710 that includes openings 711 that pass over the conductive tabs 708 such that the panel 710 engages with a rear wall of the receptacle 706. The panel 710 also includes a raised central portion or a lip 712 that is configured to engage the edges of the magnetic device 112 around the opening 206. In some embodiments, the receptacle 706 may include an integral lip or raised portion 712. The engagement between the edges of the magnetic device 112 around the opening 206 and the raise portion 712 holds the magnetic device 112 in place and prevents the magnetic device 112 from touching the conductive tabs 708. Accordingly, separate non-conductive supports may not be required. Indeed, in the illustrated embodiment, the raised portion 712 prevents horizontal or vertical movement of the magnetic device 112 relative to the conductive tabs 708. However, the magnetic device 112 can be slid along the raised portion 712 such that it disengages from the receptacle 706. Accordingly, a latch, panel, or other retention feature 714 can be fastened about the magnetic device 112 and or components of the receptacle 706 to resist or prevent such movement. In some embodiments, the magnetic device 112 may engage outer edges of the receptacle 706, which may function to prevent movement of the magnetic device 112 relative to the conductive tabs 708.

Figure 8:
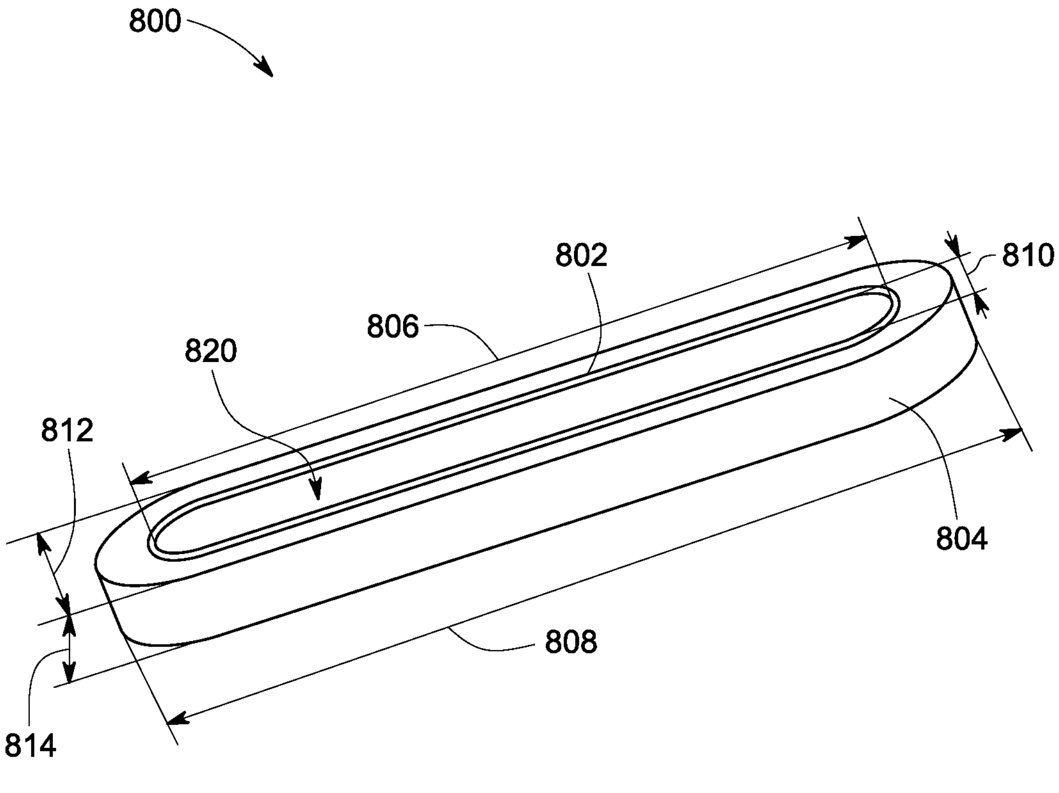
FIG. 8 is a perspective view of a common mode core that illustrates the dimensions of the common mode core in accordance with present embodiments.

As previously indicated, the magnetic device 112 includes a generally obround shape in accordance with present embodiments. This may be achieved by winding magnetic tape about an obround mandrel such that the tape is stacked up along the perimeter of the mandrel to a desired thickness. For example, in the embodiment illustrated by FIG. 8, a common mode core 800 is provided that includes a mandrel 802 having an obround perimeter and vitroperm 500F tape 804, available from OCT is Brussels, Belgium, wound around the perimeter of the mandrel 802. The inside and outside lengths 806, 808 of the resulting common mode core 800 are approximately 413-450 mm and approximately 476-520 mm respectively. The inside and outside widths 810, 812 of the resulting common mode core 800 are approximately 35-60 mm and approximately 96-127 mm respectively. The depth 814 of the common mode core 800 is approximately 30-50 mm. In other embodiments, different measurements dimensions may be utilized. The obround shape of the common mode core 800 and an opening 820 in the common mode core 800 facilitate coordination with bus bars, such as bus bars 116 in accordance with present embodiments. Indeed, the elongate nature of the common mode core 800 enables alignment with bus bar extensions (e.g., the via block 302 or the conductive tabs 708) without requiring a drawing together of such features to a narrow area using costly provisions. Further, the obround shape takes up far less space than traditional magnetic devices that are essentially round and would take up far too much space to coordinate with the spacing of the bus bars.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A magnetic device mounting system, comprising:

a common mode magnetic device including an opening through the common mode magnetic device configured to receive at least three pairs of electrically conductive extensions and electrically non-conductive supports extending from a corresponding set of three parallel bus bars to conduct three phases of electrical power through the opening;

an electrically non-conductive support of the electrically non-conductive supports; and an electrically conductive extension of the electrically conductive extensions, wherein the electrically non-conductive support and the electrically conductive extension are configured to coordinate to form a one of the at least three pairs of electrically conductive extensions and electrically non-conductive supports, engage the opening, and support the common mode magnetic device via attachment of the electrically conductive extension to one or more of the set of three parallel bus bars.

2. The system of claim 1, wherein the common mode magnetic device comprises magnetic tape wound about an obround perimeter of a mandrel such that the mandrel and magnetic tape are essentially concentric about the opening.

3. The system of claim 2, wherein the magnetic tape comprises a nanocrystalline soft magnetic material.

4. The system of claim 1, wherein the electrically conductive extension is configured to couple with a face of the bus bar such that the electrically conductive extension extends in a direction traverse to a length of the bus bar.

5. The system of claim 1, wherein the electrically conductive extension is configured to couple with the bus bar through an opening in the electrically non-conductive support such that coupling the electrically conductive extension with the bus bar couples the electrically non-conductive support to the bus bar by wedging a wall of the electrically non-conductive support against a face of the bus bar.

6. The system of claim 1, wherein the opening is obround and has a boundary that is essentially concentric with the obround perimeter of the mandrel.

7. The system of claim 1, wherein the electrically non-conductive support comprises a first sleeve configured to receive a second sleeve such that the first and second sleeves surround side portions of the electrically conductive extension and expose end portions of the electrically conductive extension.

8. The system of claim 7, wherein the first sleeve and the second sleeve each include a projection configured to abut sides of the common mode magnetic device such that the common mode magnetic device is held between the first and second sleeves when the magnetic device mounting system is assembled.

9. The system of claim 1, wherein the electrically conductive extension is integral with a bus extension configured to couple with an electronic component.

10. The system of claim 1, comprising a receptacle disposed within an outer wall of an electrical cabinet, wherein the receptacle is configured to receive the common mode magnetic device.

11. The system of claim 1, comprising the common mode magnetic device coupled with the set of three parallel bus bars via the at least three pairs of electrically conductive extensions and electrically non-conductive supports passing through the opening.

12. The system of claim 1, wherein the electrically conductive extension is configured to couple with a pair of grooves disposed along a face of the bus bar, wherein the bus bar comprises an extruded elongate body.

13. A magnetic device mounting system, comprising:
- a common mode magnetic device including an opening through the common mode magnetic device; and
- a drive component housing including a receptacle formed in the housing with a plurality of electrically conductive features extending from a central portion of the receptacle, wherein the receptacle is configured to receive the common mode magnetic device such that the plurality of electrically conductive features pass through the opening.

14. The system of claim 13, wherein the common mode magnetic device comprises magnetic tape wound about an obround perimeter of a mandrel.

15. The system of claim 13, comprising an inverter, wherein the drive component housing comprises an inverter housing.

16. The system of claim 15, wherein the electrically conductive features are communicatively coupled with an output of the inverter and are configured to couple with an electrically conductive cable or bus capable of providing power to a load.

17. The system of claim 13, comprising:
- three input buses disposed in the enclosure and configured to receive three-phase AC power;
- a converter coupled to the three input buses for receiving the three-phase AC power from the input buses and converting the three-phase AC power into DC power;
- a pair of DC conductors coupled to the converter for transmitting the DC power;
- an inverter coupled to the DC conductors for receiving the DC power and converting the DC power to a desired AC power sufficient to drive the load;
- three output buses coupled to the inverter for transmitting the desired AC power to the load;
- wherein the plurality of electrically conductive features include three electrically conductive features, each of which is coupled to a one of the three output buses.

18. A magnetic device mounting system, comprising:
- a common mode magnetic device including an opening through the common mode magnetic device configured to receive extensions from a set of three parallel bus bars;
- an electrically non-conductive support; and
- an electrically conductive extension of the extensions, wherein the electrically non-conductive support and the electrically conductive extension are configured to coordinate to engage the opening and support the common mode magnetic device via an attachment to one or more of the set of three parallel bus bars, wherein the electrically conductive extension is configured to engage with an opening in the electrically non-conductive support such that the electrically conductive extension is separated from the common mode magnetic device by the electrically non-conductive support when the magnetic device mounting system is assembled.

19. A magnetic device mounting system, comprising:
- a common mode magnetic device including an opening through the common mode magnetic device configured to receive extensions from a set of three parallel bus bars;
- an electrically non-conductive support; and
- an electrically conductive extension of the extensions comprising a via block configured to couple with a bus extension at a first end of the via block opposite a second end of the via block configured to couple with a bus bar face, wherein the electrically non-conductive support and the electrically conductive extension are configured to coordinate to engage the opening and support the common mode magnetic device via an attachment to one or more of the set of three parallel bus bars.

20. The system of claim 19, comprising the common mode magnetic device coupled with the set parallel bus bars via a plurality of electrically conductive extensions passing through the opening, wherein the plurality of electrically conductive extensions include the electrically conductive extension.

* * * * *